United States Patent
Peuhkurinen

(10) Patent No.: US 11,568,552 B2
(45) Date of Patent: Jan. 31, 2023

(54) IMAGING SYSTEMS AND METHODS INCORPORATING IMPROVED CULLING OF VIRTUAL OBJECTS

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 87 days.

(21) Appl. No.: 17/360,564

(22) Filed: Jun. 28, 2021

(65) Prior Publication Data
US 2022/0414907 A1    Dec. 29, 2022

(51) Int. Cl.
| | |
|---|---|
| *G06K 9/00* | (2022.01) |
| *G06T 7/536* | (2017.01) |
| *G06T 7/586* | (2017.01) |
| *G06T 5/00* | (2006.01) |
| *G06T 7/70* | (2017.01) |

(52) U.S. Cl.
CPC .............. *G06T 7/536* (2017.01); *G06T 5/002* (2013.01); *G06T 7/586* (2017.01); *G06T 7/70* (2017.01)

(58) Field of Classification Search
CPC ..... G06T 19/006; G06T 19/20; G06T 19/003; G06T 13/40; G06T 13/60; A63F 2300/8082
See application file for complete search history.

(56) References Cited

U.S. PATENT DOCUMENTS

| | | | | |
|---|---|---|---|---|
| 8,576,276 | B2* | 11/2013 | Bar-Zeev | G06T 19/006 |
| | | | | 348/53 |
| 9,865,089 | B2* | 1/2018 | Burns | G02B 27/0172 |
| 11,275,944 | B1* | 3/2022 | Bhushan | G06T 19/006 |
| 11,494,051 | B1* | 11/2022 | Davis | G06F 3/04886 |
| 2015/0302660 | A1* | 10/2015 | O'Connor | A63F 13/56 |
| | | | | 345/633 |
| 2017/0214899 | A1* | 7/2017 | Meier | G06T 7/73 |
| 2020/0035035 | A1* | 1/2020 | Rainisto | G06T 7/60 |
| 2020/0349772 | A1* | 11/2020 | Tkach | G06V 20/20 |
| 2022/0254120 | A1* | 8/2022 | Berliner | G06F 3/012 |
| 2022/0327792 | A1* | 10/2022 | Upendran | G06T 7/74 |

FOREIGN PATENT DOCUMENTS

WO     WO-2014178966 A1 *  11/2014  ......... G06K 9/00624

* cited by examiner

*Primary Examiner* — Shervin K Nakhjavan
(74) *Attorney, Agent, or Firm* — Ziegler IP Law Group, LLC

(57) ABSTRACT

An imaging system including visible-light camera(s), pose-tracking means, and processor(s). The processor(s) is/are configured to: control visible-light camera(s) to capture visible-light image, whilst processing pose-tracking data to determine pose of camera(s); obtain three-dimensional model of real-world environment; create occlusion mask, using three-dimensional model; cull part of virtual object(s) to generate culled virtual object(s), wherein virtual object(s) is to be embedded at given position in visible-light image; detect whether width of culled part or remaining part of virtual object(s) is less than predefined percentage of total width of virtual object(s); if width of culled part is less than predefined percentage, determine new position and embed entirety of virtual object(s) at new position to generate extended-reality image; and if width of remaining part is less than predefined percentage, cull entirety of virtual object(s).

14 Claims, 4 Drawing Sheets

IMAGING SYSTEMS AND METHODS INCORPORATING IMPROVED CULLING OF VIRTUAL OBJECTS

TECHNICAL FIELD

The present disclosure relates to imaging systems incorporating improved culling of virtual objects. The present disclosure also relates to methods incorporating improved culling of virtual objects.

BACKGROUND

In recent times, immersive extended-reality (XR) technologies such as virtual-reality (VR), augmented-reality (AR), mixed-reality (MR) are being employed in various fields such as entertainment, real estate, training, medical imaging operations, simulators, navigation, and the like. Such immersive XR technologies create immersive XR environments constituting XR images for presentation to a user of an XR device (such as an XR headset, a pair of XR glasses, or similar). The user is present in a real-world environment which may, for example, be an indoor environment or an outdoor environment. The real-world environment includes real objects present therein. In some XR environments, it is desirable to show at least some of these real objects along with virtual content (such as virtual objects). The virtual content is computer-generated content. Typically, the XR device employs an imaging system for generating XR images.

However, existing imaging systems for generating XR images representing these XR environments have several limitations. The existing imaging systems are limited in their ability to perform requisite object occlusion between the real objects and the virtual objects. The existing imaging systems improperly cull parts of virtual objects to perform occlusion and/or improperly position culled virtual objects when generating the XR images. As an example, a virtual object that is to be partially occluded by a real object may be culled to an improper extent for implementing such occlusion. As another example, a culled virtual object that is to be partially occluded by a real object may be improperly positioned on top of or too far from the real object. This improper object occlusion undesirably lowers realism and immersiveness within the XR environments. In such a case, the XR images appear unnatural to the user of the XR device. For example, when a culled virtual object is improperly positioned when generating an XR image, the culled virtual object is perceived as a visual glitch by the user viewing the generated XR image.

Therefore, in light of the foregoing discussion, there exists a need to overcome the aforementioned drawbacks associated with the existing imaging systems for producing the XR images.

SUMMARY

The present disclosure seeks to provide an imaging system incorporating improved culling of virtual objects. The present disclosure also seeks to provide a method incorporating improved culling of virtual objects. An aim of the present disclosure is to provide a solution that overcomes at least partially the problems encountered in prior art.

In one aspect, an embodiment of the present disclosure provides an imaging system comprising:
   at least one visible-light camera;
   pose-tracking means; and
   at least one processor configured to:
   control the at least one visible-light camera to capture a given visible-light image of a real-world environment, whilst processing pose-tracking data obtained from the pose-tracking means to determine a corresponding pose of the at least one visible-light camera with respect to which the given visible-light image is captured;
   obtain a three-dimensional model of the real-world environment;
   create an occlusion mask for a view of the real-world environment that corresponds to the determined pose of the at least one visible-light camera, using the three-dimensional model of the real-world environment;
   cull a part of at least one virtual object, based on the occlusion mask, to generate at least one culled virtual object representing a remaining part of the at least one virtual object, wherein the at least one virtual object is to be embedded at a given position in the given visible-light image;
   detect whether a width of the culled part or the remaining part of the at least one virtual object is less than a predefined percentage of a total width of the at least one virtual object;
   if the width of the culled part of the at least one virtual object is less than the predefined percentage of the total width, determine a new position that is offset by at least the width of the culled part from the given position and embed an entirety of the at least one virtual object at the new position in the given visible-light image to generate an extended-reality image; and
   if the width of the remaining part of the at least one virtual object is less than the predefined percentage of the total width, cull the entirety of the at least one virtual object.

In another aspect, an embodiment of the present disclosure provides a method comprising:
   controlling at least one visible-light camera to capture a given visible-light image of a real-world environment, whilst processing pose-tracking data obtained from pose-tracking means to determine a corresponding pose of the at least one visible-light camera with respect to which the given visible-light image is captured;
   obtaining a three-dimensional model of the real-world environment;
   creating an occlusion mask for a view of the real-world environment that corresponds to the determined pose of the at least one visible-light camera, using the three-dimensional model of the real-world environment;
   culling a part of at least one virtual object, based on the occlusion mask, to generate at least one culled virtual object representing a remaining part of the at least one virtual object, wherein the at least one virtual object is to be embedded at a given position in the given visible-light image;
   detecting whether a width of the culled part or the remaining part of the at least one virtual object is less than a predefined percentage of a total width of the at least one virtual object;
   if the width of the culled part of the at least one virtual object is less than the predefined percentage of the total width, determining a new position that is offset by at least the width of the culled part from the given position and embedding an entirety of the at least one virtual object at the new position in the given visible-light image to generate an extended-reality image; and if the width of the remaining part of the at least one virtual object is less than the predefined percentage of the total width, culling the entirety of the at least one virtual object.

Embodiments of the present disclosure substantially eliminate or at least partially address the aforementioned problems in the prior art, and enable implementation of accurate and realistic culling of virtual object(s) for generation of high-quality, visually-pleasing and realistic (namely, natural-looking) extended-reality images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A illustrates an exemplary intermediate extended-reality image, while

FIG. 5A illustrates an exemplary intermediate extended-reality image, while

Figure 1:
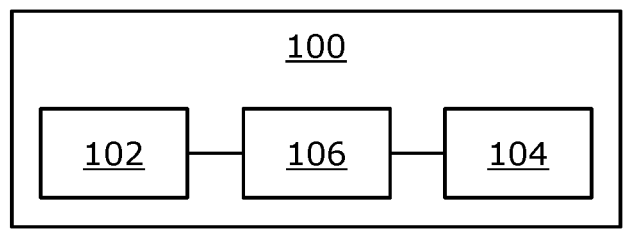
FIGS. 1 and 2 illustrate block diagrams of architectures of an imaging system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:
at least one visible-light camera;
pose-tracking means; and
at least one processor configured to:
control the at least one visible-light camera to capture a given visible-light image of a real-world environment, whilst processing pose-tracking data obtained from the pose-tracking means to determine a corresponding pose of the at least one visible-light camera with respect to which the given visible-light image is captured;
obtain a three-dimensional model of the real-world environment;
create an occlusion mask for a view of the real-world environment that corresponds to the determined pose of the at least one visible-light camera, using the three-dimensional model of the real-world environment;
cull a part of at least one virtual object, based on the occlusion mask, to generate at least one culled virtual object representing a remaining part of the at least one virtual object, wherein the at least one virtual object is to be embedded at a given position in the given visible-light image;
detect whether a width of the culled part or the remaining part of the at least one virtual object is less than a predefined percentage of a total width of the at least one virtual object;
if the width of the culled part of the at least one virtual object is less than the predefined percentage of the total width, determine a new position that is offset by at least the width of the culled part from the given position and embed an entirety of the at least one virtual object at the new position in the given visible-light image to generate an extended-reality image; and
if the width of the remaining part of the at least one virtual object is less than the predefined percentage of the total width, cull the entirety of the at least one virtual object.

In another aspect, an embodiment of the present disclosure provides a method comprising:
controlling at least one visible-light camera to capture a given visible-light image of a real-world environment, whilst processing pose-tracking data obtained from pose-tracking means to determine a corresponding pose of the at least one visible-light camera with respect to which the given visible-light image is captured;
obtaining a three-dimensional model of the real-world environment;
creating an occlusion mask for a view of the real-world environment that corresponds to the determined pose of the at least one visible-light camera, using the three-dimensional model of the real-world environment;
culling a part of at least one virtual object, based on the occlusion mask, to generate at least one culled virtual object representing a remaining part of the at least one virtual object, wherein the at least one virtual object is to be embedded at a given position in the given visible-light image;
detecting whether a width of the culled part or the remaining part of the at least one virtual object is less than a predefined percentage of a total width of the at least one virtual object;
if the width of the culled part of the at least one virtual object is less than the predefined percentage of the total width, determining a new position that is offset by at least the width of the culled part from the given position and embedding an entirety of the at least one virtual object at the new position in the given visible-light image to generate an extended-reality image; and if the width of the remaining part of the at least one virtual object is less than the predefined percentage of the total width, culling the entirety of the at least one virtual object.

The present disclosure provides the aforementioned imaging system and the aforementioned method incorporating improved culling of virtual objects. Herein, the imaging system utilizes both the occlusion mask and the predefined percentage of the total width of the at least one virtual object to perform requisite object occlusion between real objects and the at least one virtual object when generating the extended-reality (XR) image. Since the occlusion mask is generated using the three-dimensional model of the real-world environment, the occlusion mask enables the at least one processor to accurately determine how occlusion is to occur and how much to cull the at least one virtual object, for generating the XR image. Moreover, utilizing the predefined percentage to either use the entirety of the at least one virtual object or none of the at least one virtual object for embedding, prevents improper culling from being performed by the at least one processor. Advantageously, when a user of a display device (such as an XR device) views the XR image, the user experiences realism and immersiveness within an XR environment. The imaging system facilitates realistic occlusion between the real objects and the at least one virtual object in the XR image to enhance a viewing experience of the user within the XR environment. Beneficially, the XR images are generated in real time or near real time. Moreover, the imaging system beneficially implements marker-less occlusion and culling of the at least one virtual object. The method is fast, effective, reliable and can be implemented and used easily.

The imaging system comprises specialized equipment for generating the extended-reality (XR) images in real time or near-real time. Optionally, the imaging system communicates the XR images to a display device, for displaying at the display device. The XR images are to be presented to a user of the display device. Herein, the term "display device" refers to a specialized equipment that is capable of displaying the XR images. These XR images optionally constitute a visual scene of an XR environment. Optionally, the display device is implemented as a head-mounted display (HMD). The term "head-mounted display" refers to specialized equipment that is configured to present the XR environment to a user when said HMD, in operation, is worn by the user on his/her head. The HMD is implemented, for example, as an XR headset, a pair of XR glasses, and the like, that is operable to display the visual scene of the XR environment to the user. The term "extended-reality" encompasses virtual reality (VR), augmented reality (AR), mixed reality (MR), and the like.

Optionally, the display device comprises at least one light source. The term "light source" refers to an element from which light emanates. The at least one light source is driven to display the XR images generated by the imaging system. Optionally, a given light source is implemented as a display. In this regard, an XR image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, an XR image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector. Optionally, the given light source is a multi-resolution light source, or a single-resolution light source.

In some implementations, the imaging system is optionally integrated with the display device. In such implementations, the imaging system is physically coupled to the display device (for example, attached via mechanical and/or electrical connections to components of the display device). For example, the at least one visible-light camera may be arranged on an outer surface of the display device that faces the real-world environment. Optionally, in such implementations, the at least one processor of the imaging system serves as a processor of the display device. Alternatively, optionally, in such implementations, the at least one processor is communicably coupled to a processor of the display device wirelessly and/or in a wired manner.

In other implementations, the imaging system is optionally implemented on a remote device that is separate from the display device. In such implementations, the at least one processor and a processor of the display device are communicably coupled wirelessly and/or in a wired manner. Optionally, the imaging system is mounted on the remote device. Examples of the remote device include, but are not limited to, a drone, a vehicle, and a robot. Optionally, the remote device is physically positioned in the real-world environment, whereas the user of the display device is positioned away from (for example, at a distance from) the remote device.

In yet other implementations, the imaging system is optionally arranged at a given location within the real-world environment. For example, the imaging system may be arranged on a support structure and may be capable of three-dimensional (3D) rotation. Herein, the support structure can be moved to any required location in the real-world environment.

Throughout the present disclosure, the term "visible-light camera" refers to an equipment that is operable to detect and process signals, such as visible-light signals, received from the real-world environment, so as to capture the given visible-light image of the real-world environment. Examples of the at least one visible-light camera include, but are not limited to, a Red-Green-Blue (RGB) camera, a Red-Green-Blue-Alpha (RGB-A) camera, a Red-Green-Blue-Depth (RGB-D) camera, a monochrome camera.

It will be appreciated that the given visible-light image of the real-world environment is captured from a certain pose of the at least one visible-light camera. In other words, the at least one visible-light camera is arranged to capture the given visible-light image of the real-world environment from a perspective of the corresponding pose of the at least one visible-light camera. The pose-tracking data corresponding to a time of capturing the given visible-light image is processed to determine the pose of the at least one visible-light camera with respect to which the given visible-light image is captured. The given visible-light image of the real-world environment is subsequently used to generate the XR image.

Throughout the present disclosure, the term "pose-tracking means" refers to specialized equipment that is employed to detect and/or follow a pose of at least the at least one visible-light camera. The term "pose" encompasses both position and orientation. Optionally, the pose-tracking means is employed to track a pose of the display device that is worn by the user on his/her head, when the at least one visible-light camera is mounted on the display device. Thus, in such a case, the pose of the at least one visible-light camera changes according to a change in the pose of the display device. Pursuant to embodiments of the present disclosure, the pose-tracking means is implemented as a true six Degrees of Freedom (6DoF) tracking system. In other words, the pose-tracking means tracks both position and orientation of at least the at least one visible-light camera within a 3D space of the real-world environment. In particular, said pose-tracking means is configured to track translational movements (namely, surge, heave and sway movements) and rotational movements (namely, roll, pitch and yaw movements) of at least the at least one visible-light camera within the 3D space.

The pose-tracking means could be implemented as an internal component of the imaging system, as a tracking system external to the imaging system, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, the at least one processor employs at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to track at least the pose of the at least one visible-light camera. Examples of the at least one data processing algorithm include a feature detection algorithm, an environment mapping algorithm, a pose data extrapolation algorithm, and the like.

Optionally, the at least one processor is communicably coupled to the at least one visible-light camera and the pose-tracking means wirelessly and/or in a wired manner. The at least one processor may be understood to be a compositor (namely, a processing unit that is configured to perform at least the compositing tasks pertaining to generation of the XR images). The compositor is a software module taking various inputs (such as the given visible-light image, the at least one virtual object, and the at least one culled virtual object) and composing (namely, building or generating) the XR image to be displayed at the display device.

Throughout the present disclosure, the term "three-dimensional model of the real-world environment" refers to a data structure that comprises comprehensive information pertaining to a 3D space of the real-world environment. Such a comprehensive information is indicative of a plurality of features of real objects present in the real-world environment, shapes and sizes of the real objects or their portions, poses of the real objects or their portions, optical depths of the real objects or their portions, materials of the real objects or their portions, colours of the real objects or their portions, light sources and lighting conditions within the real-world environment, and the like. The term "real object" encompasses a physical object, a part of the physical object, as well as a shadow casted by the physical object or its part. The real object could be a living object (for example, such as a human, a pet, and the like) or a non-living object (for example, such as the sky, a building, a road, a toy, a poster, a letter box, and the like).

Optionally, the 3D model of the real-world environment is in a form of at least one of: an environment map, a photogrammetric model, a 3D quadrilateral mesh model, a parametric model, a 3D point cloud model, or a 3D data structure that is based on triangles, non-uniform rational basis splines (NURBS) or other surfaces, or voxels. Other suitable forms of the 3D model are also feasible.

In an embodiment, the imaging system further comprises a plurality of image sensors, wherein, when obtaining the three-dimensional model of the real-world environment, the at least one processor is configured to:

control the plurality of image sensors to capture a plurality of images of the real-world environment, whilst processing the pose-tracking data to determine corresponding poses of the plurality of image sensors with respect to which the plurality of images are captured; and process the plurality of images, based on the corresponding poses of the plurality of image sensors, to generate the three-dimensional model of the real-world environment.

The term "image sensor" refers to a sensor that is operable to detect and process light from the real-world environment, so as to capture a given image of the real-world environment. The given image may represent real object(s) present in the real-world environment. The plurality of images may comprise visible-light images, stereo images and/or depth images. Examples of a given image sensor include, but are not limited to, a charge-coupled device (CCD) image sensor, a complementary metal-oxide-semiconductor (CMOS) image sensor.

It will be appreciated that the plurality of image sensors are parts of a plurality of cameras. The plurality of cameras could be arranged on the display device worn by the user on his/her head, or could be arranged anywhere in the real-world environment where the user is present, or could be arranged on the remote device present in the real-world environment. Examples of a given camera amongst plurality of cameras include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment, a Red-Green-Blue (RGB) camera, a Red-Green-Blue-Alpha (RGB-A) camera. Optionally, the plurality of cameras comprise the at least one visible-light camera.

Optionally, the pose-tracking means is employed to detect and/or follow poses of the plurality of the image sensors. Optionally, the pose-tracking means is employed to track a pose of the display device that is worn by the user on his/her head, when the plurality of the image sensors are mounted on the display device. Thus, in such a case, the poses the plurality of the image sensors change according to a change in the pose of the display device. Optionally, the pose-tracking means tracks both positions and orientations of the plurality of the image sensors within the 3D space of the real-world environment. It will be appreciated that the given image of the real-world environment is captured from a certain pose of the given image sensor. In other words, the given image sensor (of a given camera) is arranged to capture the given image of the real-world environment from a perspective of a corresponding pose of the given image sensor. The pose-tracking data corresponding to a time of capturing the given image is processed to determine the pose of the given image sensor with respect to which the given image is captured.

Optionally, the plurality of images are processed along with the corresponding poses of the plurality of image sensors, to enable the at least one processor to extract the plurality of features of the real objects represented in the plurality of images and to generate the comprehensive information constituting the 3D model (for example, such as photogrammetry data) from various perspectives of the corresponding poses of the plurality of image sensors. Beneficially, the 3D model generated in such a manner is highly accurate (in terms of reconstructing the real-world environment), realistic, and is information-rich. The 3D model would be generated in real time or near real time. It will be appreciated that the at least one processor may be configured to pre-process the comprehensive information pertaining to the 3D space of the real-world environment, prior to obtaining the 3D model of the real-world environment. Optionally, when processing the plurality of images to generate the three-dimensional model of the real-world environment, the at least one processor is configured to employ at least one data processing algorithm. Optionally, the at least one data processing algorithm is at least one of: a feature extraction algorithm, an image stitching algorithm, an image merging algorithm, an interpolation algorithm, a 3D modelling algorithm, a photogrammetry algorithm. Such data processing algorithms are well-known in the art. Examples of the features include, but are not limited to, edges, corners, blobs and ridges. Examples of the at least one feature-extraction algorithm include, but are not limited to: an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector and the like), a feature descriptor algorithm (for example, such as Binary Robust Independent Elementary Features (BRIEF), Gradient Location and Orientation Histogram (GLOH), Histogram of Oriented Gradients (HOG) and the like), and a feature detector algorithm (for example, such as Scale-Invariant Feature Transform (SIFT), Oriented FAST and rotated BRIEF (ORB), Speeded Up Robust Features (SURF) and the like).

In another embodiment, the 3D model of the real-world environment is previously generated prior to or at a start of an XR session. In this regard, the 3D model of the real-world environment is received by the at least one processor prior to or at the start of the XR session. The 3D model may be previously generated by another imaging system, a 3D modelling system, and the like. Optionally, the at least one processor is configured to receive the 3D model of the real-world environment from a data repository. In such a case, the 3D model is pre-stored at the data repository. The data repository may be implemented as a memory of the display device, a memory of a computer coupled to the display device, a cloud-based database arrangement, or similar.

Optionally, the 3D is not updated during the XR session by the at least one processor. In such a case, the 3D model is used by the at least one processor as it is during the XR session. Alternatively, optionally, the 3D model is dynamically updated during the XR session by the at least one processor, based on the plurality of images of the real-world environment that are captured by the plurality of image sensors during the XR session. Such a dynamic updation may occur in real time or near real time. In an example, the shapes of the real objects or their portions may be updated based on the plurality of features of the real objects that are extracted using real time images (captured by the plurality of image sensors) of the real-world environment and up-to-date optical depths of the real objects or their portions. It will be appreciated that the 3D model of the real-world environment could be periodically updated (for example, after every 10 minutes), or could be intermittently updated (for example, after 10 minutes, then after 30 minutes, and then after 20 minutes), or could be updated based on a user-input, during the XR session.

Throughout the present disclosure, the term "occlusion mask" refers to a mask that forms a frame of reference for object occlusion in the view of the real-world environment that corresponds to the determined pose of the at least one visible-light camera. In other words, the occlusion mask defines how the real objects or their portions is/are occluded (namely, hidden or obscured) in the view of the real-world environment captured in the given visible-light image. It will be appreciated that the occlusion mask is a view-based mask i.e., occlusion mask changes with change in the view of the real-world environment, wherein the change in the view occurs upon change in the pose of the at least one visible-light camera. For example, a first real object may be occluded by a second real object in a first view corresponding to a first pose of the at least one visible-light camera, but the first real object may become visible in a second view corresponding to a second pose of the at least one visible-light camera. In the first view, an optical depth of the first real object is greater than an optical depth of the second real object.

It will be appreciated that when creating the occlusion mask, the at least one processor utilizes the comprehensive information (such as features, shapes, sizes, poses, optical depths, and the like, of the real objects) of the 3D model of the real-world environment, as the object occlusion is to be performed based on the comprehensive information. Beneficially, the occlusion mask created in such a manner is highly accurate and reliable in forming the frame of reference for the object occlusion by accurately and precisely identifying the real objects or their portions that are occluded by the other real objects or their portions in the view of the real-world environment.

Optionally, the at least one processor is configured to determine, for the given position of embedding the at least one virtual object, the part of the at least one virtual object that is to be occluded in the given visible-light image according to the occlusion mask. It is to be understood that the part of the at least one virtual object may be occluded by the real objects or their portions represented in the given visible-light image, therefore said part is culled as it would realistically not be visible in subsequently generated XR image and would not be perceived by the user. In such a case, the at least one processor is configured to cull (namely, remove or eliminate) the part of the at least one virtual object that is to be occluded, for generating realistic XR images. Upon culling the part of the at least one virtual object, the at least one virtual object is dissected into two parts: the culled part and the remaining part of the at least one virtual object. This remaining part of the at least one virtual object would be visible (as it is not occluded according to the occlusion mask) in the subsequently generated XR image and would be perceived by the user. In an example, the at least one processor may cull one-third part of the at least one virtual object to generate the at least one culled virtual object representing remaining two-third part of the at least one virtual object.

Optionally, when culling the part of the at least one virtual object to generate the at least one culled virtual object, the at least one processor is configured to employ at least one image processing algorithm. Optionally, the at least one image processing algorithm is at least one of: an image slicing algorithm, an image culling algorithm, an image cropping algorithm, an image segmentation algorithm.

Throughout the present disclosure, the term "virtual object" refers to a computer-generated object (namely, a digital object). Examples of the at least one virtual object may include, but are not limited to, a virtual information (such as a virtual news description, a virtual announcement, virtual data, and so forth), a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), and a virtual vehicle or part thereof (such as a virtual car, a virtual cockpit, and so forth).

It will be appreciated that since the at least one virtual object is generated by the at least one processor, the given position in the given visible-light image where the at least one virtual object is to be embedded, as well as information (such as a shape, a size, a colour, an orientation, and the like) of the at least one virtual object are pre-known and accurately known to the at least one processor. The size of the at least one virtual object may be in terms of width, height, and the like, of the at least one virtual object. The size may be expressed in units of a total number of pixels. Other terms or units for expressing the size of the at least one virtual object are also feasible.

Next, the at least one processor detects an extent of culling of the at least one virtual object with respect to the (original) total width of the at least one virtual object. When the extent of culling is high (i.e., the at least one virtual object is almost hidden), it would be accurate to cull the entirety of the at least one virtual object for preventing improper culling, whereas when the extent of culling is low (i.e., the at least one virtual object is minorly culled and most of its remaining part is visible), it would be accurate to embed the entirety of the at least one virtual object in the given visible-light image for preventing improper culling.

Optionally, the predefined percentage lies in a range of 1 percent to 50 percent of the total width of the at least one virtual object. More optionally, the predefined percentage lies in a range of 1 percent to 40 percent of the total width of the at least one virtual object. Yet more optionally, the predefined percentage lies in a range of 1 percent to 25 percent of the total width of the at least one virtual object. As an example, the predefined percentage may be from 1, 2, 3, 4, 5, 7, 9, 11, 13, 15, 25, 30, 35 or 40 percent up to 5, 10, 15, 20, 30, 40 or 50 percent of the total width of the at least one virtual object.

When the width of the culled part of the at least one virtual object is less than the predefined percentage of the total width, the culled part is too small in size. Moreover, occluding such a small-sized culled part in the given visible-light image to generate the XR image would not be very useful from a point of view of emulating realism in the XR image, and would also need very high accuracy and precision. This would require employing considerable processing resources and time when generating the XR image, for achieving a (not-very useful) culling effect in the XR image. Therefore, in such a case, rather than embedding only the remaining part of the at least one virtual object, the entirety of the at least one virtual object is embedded in the given visible-light image to generate the XR image. As the culling of the part of at least one virtual object was previously performed based on the given position, but now the entirety of the at least one virtual object is to be shown, therefore, the new position is determined. The new position is offset from the given position by a requisite extent so that the culled part of at least one virtual object can be realistically accommodated in a space between the given position and the new position.

When the width of the remaining part of the at least one virtual object is less than the predefined percentage of the total width, the remaining part is too small in size. Moreover, embedding such a small-sized remaining part in the given visible-light image to generate the XR image would not be very useful from a point of view of emulating realism in the XR image, and would also need very high accuracy and precision. This would require employing considerable processing resources and time when generating the XR image. Therefore, in such a case, rather than embedding only the small-sized remaining part of the at least one virtual object, the entirety of the at least one virtual object is culled, and thus the at least one virtual object is not used when generating the XR image. In such a case, only the given visible-light image is used by the at least one processor to generate the XR image.

In an example, the total width of the at least one virtual object may be 100 pixels, the width of the culled part of the at least one virtual object may be 5 pixels, and the predefined percentage may be 25 percent of the total width. Herein, the width of the culled part is less than the predefined percentage of the total width (i.e., 5 pixels being less than 25 pixels). Therefore, the new position is determined such that it is offset by at least 5 pixels from the given position where the at least one virtual object was to be embedded. Now, the entirety of the at least one virtual object is embedded at the new position in the given visible-light image to generate the XR image. In another example, the total width of the at least one virtual object may be 250 pixels, the width of the remaining part of the at least one virtual object may be 15 pixels, and the predefined percentage may be 50 percent of the total width. Herein, the width of the remaining part is less than the predefined percentage of the total width (i.e., 15 pixels being less than 125 pixels). Therefore, the entirety of the at least one virtual object is culled, and only the given visible-light image is used to generate the XR image.

Optionally, the at least one processor is configured to:
 if none of the width of the culled part or the remaining part of the at least one virtual object is less than the predefined percentage of the total width,
  embed the at least one culled virtual object at the given position in the given visible-light image to generate an intermediate extended-reality image; and apply a blur and fade filter to pixel values of a region in the intermediate extended-reality image that spans across a culled boundary of the at least one culled virtual object, to generate the extended-reality image.

Optionally, in this regard, when none of the width of the culled part or the remaining part of the at least one virtual object is less than the predefined percentage of the total width, the culled part is significant enough to be occluded and the remaining part is significant enough to be embedded in the given visible-light image, to generate the XR image that is realistic. Therefore, in such a case, the at least one culled virtual object is embedded at the given position in the given visible-light image to generate the intermediate XR image in a manner that upon embedding, the culled part is occluded (i.e., not shown) and the remaining part is visible in the intermediate XR image. The intermediate XR image is not shown to the user. In an example, the total width of the at least one virtual object may be 150 pixels, the width of the culled part may be 65 pixels, the width of the remaining part may be 85 pixels, and the predefined percentage may be 30 percent of the total width. Herein, the widths of the culled and remaining parts are more than the predefined percentage of the total width (i.e., 65 pixels and 85 pixels being more than 45 pixels). Therefore, the at least one culled virtual object is embedded at the given position in the given visible-light image to generate an intermediate XR image.

The culled boundary is a dividing boundary between the culled part and the remaining part of the at least one virtual object. Such a culled boundary is a culled edge of the at least one culled virtual object. It will be appreciated that a shape of the culled boundary could be a linear shape, a non-linear shape, a freeform shape, and the like. When the at least one culled virtual object is embedded at the given position in the given visible-light image, the at least one culled virtual object may appear to be perceivably-disjointed (i.e., inaccurately embedded) from real objects in the intermediate XR image. This would undesirably affect realism and immersiveness in the XR environment as disjointed embedding of the at least one culled virtual object would be perceived as a visual glitch by the user in the XR environment. Therefore, the at least one processor optionally applies the blur and fade filter to the pixel values of the region in the intermediate XR image that spans across the culled boundary, so that said region appears to be faded and/or blurred. This makes the at least one culled virtual object appear smoothly and gradually blended (i.e., seamlessly merged) with the real objects of the intermediate XR image, thereby realistically generating the XR image. Beneficially, the XR image generated in such a manner would be natural-looking as real and virtual parts of the XR image are embedded and occluded realistically with respect to each other, to provide an enhanced viewing experience to the user viewing the XR image. Optionally, the blur and fade filter implements at least one of: a gaussian blur, a motion blur, a selective blur, a box blur, a lens blur, a shape blur, a fade-in effect, a fade-out effect, a selective fading effect. Such a blur and fade filter is well-known in the art.

Optionally, the at least one processor is configured to:
detect, using the occlusion mask, a shape of a boundary of the real object occluding the at least one virtual object that is in a proximity of the culled boundary of the at least one culled virtual object; and
identify said region in the intermediate extended-reality image, based on a relative position of the culled boundary of the at least one culled virtual object with respect to the boundary of the real object.

In this regard, the occlusion mask optionally represents boundaries of the real objects or their parts along which occlusion occurs. Moreover, shapes of such boundaries are also represented in the occlusion mask as these shapes are accurately known in the 3D model and the occlusion mask is generated using the 3D model. Given a position where the at least one virtual object or the at least one culled virtual object is to be embedded, the at least one processor detects which boundary of which real object is in proximity of the culled boundary, and also detects the shape of the boundary of the real object. In this manner, both the boundary of the real object and the shape of the boundary are highly accurately detected by the at least one processor. Advantageously, the boundary of the real object could be used by the at least one processor as a reference when applying the blur and fade filter to the pixel values of the region in the intermediate XR image that spans across the culled boundary of the at least one culled virtual object. For example, the blur and fade filter may be applied to the pixel values of said region in a direction from the culled boundary towards the boundary of the real object. Optionally, when identifying said region in the intermediate XR image, a portion in the intermediate XR image extending between the culled boundary of the at least one culled virtual object and the boundary of the real object is identified as said region. Beneficially, said region is identified with a high accuracy in the above manner, and thus the blur and fade filter is properly applied to the pixel values of the region. It will be appreciated that a shape of the region is defined by shapes of the culled boundary of the at least one culled virtual object and the boundary of the real object.

Optionally, the at least one virtual object or the at least one culled virtual object is embedded in the given visible-light image using a blending technique to generate a realistic (namely, a natural-looking) XR image. The blending technique may, for example, be depth estimation or alpha blending, or similar. The blending technique enables in realistically mixing the at least one virtual object or the at least one culled virtual object with the real objects in the given visible-light image.

Optionally, the at least one processor is configured to pre-process the given visible-light image, prior to embedding the at least one virtual object or the at least one culled virtual object in the given visible-light image. In this regard, image signals captured by pixels of image sensor(s) of the at least one visible-light camera are processed for enhancing a quality of the given visible-light image. Optionally, the given visible-light image is pre-processed for at least one of: black level correction, defective pixel correction, Bayer domain denoising, lens shading correction, scaling, automatic white balance gain adjustment, demosaicking, automatic white balance static parameters adjustment, colour conversion matrix interpolation, autofocus, auto exposure, gamma correction, colour space conversion, luma and chroma denoising, sharpening and edge enhancement, contrast adjustment, reprojection, cropping, and resizing.

Optionally, the at least one processor is configured to:
determine a tolerance limit of the pose of the at least one visible-light camera; and adjust the predefined percentage based on the tolerance limit.

The phrase "tolerance limit of the pose of the at least one visible-light camera" refers to a permissible (namely, allowable) variation of the pose of the at least one visible-light camera from an actual (namely, real) pose of the at least one visible-light camera. It will be appreciated that the tolerance limit of the pose is determined since all tracking (such as the pose tracking performed by the pose-tracking means) realistically has some error. In an example, the tolerance limit for the GPU tracking system may be expressed as +/−1 meter from an actual position of the at least one visible-light camera. In another example, the tolerance limit for the inside-out pose-tracking system may be +/−few centimetres from an actual position of the at least one visible-light camera. In yet another example, the tolerance limit for the IMU may be +/−0.1 degree from an actual orientation of the at least one visible-light camera.

The tolerance limit may be described in terms of a normal probability distribution, a Gaussian probability distribution, and the like. Other distributions for the tolerance limit are also feasible based on a type of the pose-tracking means and are characterized by resolution steps, or similar. In a first example, the tolerance limit of the pose of the at least one visible-light camera may be +/−10 percent. This means that a probability of detecting, for example, that the width of the remaining part of the at least one virtual object is less than 15 percent (i.e., the predefined percentage) of the total width of the at least one virtual object, may be greater than or equal to 90 percent. Herein, the entirety of the at least one virtual object is culled, and the at least one virtual object is not shown in the generated XR image.

It will be appreciated that optionally the tolerance limit of the pose of the at least one visible-light camera depends on a quality of the pose-tracking data. Optionally, the quality of the pose-tracking data is directly related to pose-tracking accuracy, and is inversely related to pose-tracking latency. The pose-tracking accuracy is indicative of correctness in determining the pose of the at least one visible-light camera. The pose-tracking latency is indicative of a delay in determining the pose of the at least one visible-light camera. Such a delay adversely affects the quality of the pose-tracking data. Lesser the pose-tracking latency, greater is the quality of the pose-tracking data. A low pose-tracking latency allows for producing up-to-date pose-contingent XR environment for presenting at the display device.

Optionally the at least one processor is configured to determine the quality of the pose-tracking data by:
  comparing a current pose with a pose predicted based on a previous pose and a velocity and/or an acceleration with which the pose is changing; and/or
  comparing pose-tracking data collected by a pose-tracking means with pose-tracking data collected by another pose-tracking means.

It will be appreciated that the aforesaid comparisons are utilized by the at least one processor to determine the quality of the pose-tracking data. Upon the aforesaid comparisons, if there is detected a match or reasonable similarity, such as between the current pose and the predicted pose and/or between pose-tracking data collected by different pose-tracking means, a high quality of the pose-tracking data is determined by the at least one processor. Thus, a low tolerance limit is determined by the at least one processor because of a high certainty of correctness of the pose-tracking data. The tolerance limit is related to the quality of the pose-tracking data. As an example, the at least one processor may determine the tolerance limit by comparing the pose-tracking data collected by the optics-based tracking system (such as an inside-out tracking system) and the pose-tracking data collected by, for example, the GPS tracking system, or the magnetism-based tracking system, or the IMU.

Since the criteria for culling the part of the at least one virtual object is based on the predefined percentage, adjusting the predefined percentage based on the tolerance limit takes into account how the tolerance limit of the pose of the at least one visible-light camera and/or the quality of the pose-tracking data affect(s) said culling. It will be appreciated that greater the quality of the pose-tracking data, lesser is the tolerance limit, and lower is the predefined percentage, and vice versa. Beneficially, the predefined percentage could be accurately and precisely adjusted based on the tolerance limit. Referring to the first example, when the width of the remaining part of the at least one virtual object may be 13 percent of the total width (i.e., less than the predefined percentage), and the tolerance limit is +/−10 percent, it indicates that the quality of the pose-tracking data is considerably high and thus the entirety of the at least one virtual object is culled. However, when the tolerance limit is +/−30 percent, the predefined percentage may be adjusted to 11 percent of the total width to compensate for a low quality of the pose-tracking data. Herein, when the width of the remaining part of the at least one virtual object is 13 percent of the total width, the entirety of the at least one virtual object is not culled.

Optionally, the at least one processor is configured to:
  cull a part of a first virtual object that is to be occluded by at least one second virtual object to generate a first culled virtual object representing a remaining part of the first virtual object, wherein the first virtual object is to be embedded at a first position in the given visible-light image;
  detect whether a width of the culled part or the remaining part of the first virtual object is less than the predefined percentage of a total width of the first virtual object;
  if the width of the culled part of the first virtual object is less than the predefined percentage of the total width, determine a second position that is offset by at least the width of the culled part of the first virtual object from the first position and embed an entirety of the first virtual object at the second position in the given visible-light image to generate the extended-reality image; and
  if the width of the remaining part of the first virtual object is less than the predefined percentage of the total width, cull the entirety of the first virtual object.

Optionally, in this regard, the at least one virtual object comprises the first virtual object and the at least one second virtual object. The part of the first virtual object that is to be occluded by the at least one second virtual object, is culled as it would realistically not be visible in subsequently generated XR image and should not be perceived by the user. Such an occlusion may occur when the at least one second virtual object partially superimposes the first virtual object. It will be appreciated that since the at least one processor generates the first virtual object and the at least one second virtual object, positions, shapes, sizes, and optical depths of both the first virtual object and the at least one second virtual object are already known and accurately known the at least one processor. Thus, the at least one processor accurately determines, for the first position of embedding the first virtual object, the part of the first virtual object that is to be occluded by the at least one second virtual object.

When the width of the culled part of the first virtual object is less than the predefined percentage of the total width, the culled part of the first virtual object is too small i.e., the first virtual object is almost hidden behind the at least one second virtual object. Therefore, in such a case, rather than embedding only the remaining part of the first virtual object, the entirety of the first virtual object is embedded in the given visible-light image to generate the XR image. In that case, the entirety of the first virtual object, the at least one second virtual object, and the given visible-light image are used by the at least one processor to generate the XR image. As the culling of the part of first virtual object was previously performed based on the first position, but now the entirety of the first virtual object is to be shown, therefore, the second position is determined. The second position is offset from the first position by a requisite extent so that the culled part of first virtual object can be realistically accommodated in a space between the first position and the second position.

When the width of the remaining part of the first virtual object is less than the predefined percentage of the total width, the remaining part of the first virtual object is too small in size i.e., the first virtual object is minorly culled and most of its remaining part is visible. Therefore, in such a case, rather than embedding only a small-sized remaining part of the first virtual object, the entirety of the first virtual object is culled, and thus the first virtual object is not used when generating the XR image. In such a case, the at least one second virtual object and the given visible-light image are used by the at least one processor to generate the XR image. Optionally, the predefined percentage lies in a range of 1 percent to 50 percent of the total width of the first virtual object.

Optionally, the at least one processor is configured to:
if none of the width of the culled part or the remaining part of the first virtual object is less than the predefined percentage of the total width,
    embed the first culled virtual object at the first position in the given visible-light image to generate the intermediate extended-reality image; and
    apply a blur and fade filter to pixel values of a first region in the intermediate extended-reality image that spans across a culled boundary of the first culled virtual object, to generate the extended-reality image.

In this regard, when none of the width of the culled part or the remaining part of the first virtual object is less than the predefined percentage of the total width, the culled part of the first virtual object is significant enough to be occluded and the remaining part of the first virtual object is significant enough to be embedded in the given visible-light image, to generate the XR image that is realistic. Therefore, in such a case, the first culled virtual object is embedded at the first position in the given visible-light image to generate the intermediate XR image in a manner that upon embedding, the culled part is occluded (i.e., not shown) and the remaining part is visible in the intermediate XR image. The intermediate XR image is not shown to the user.

When the first culled virtual object is embedded at the first position in the given visible-light image, the first culled virtual object may appear to be perceivably-disjointed from the at least one second virtual object and/or real objects in the intermediate XR image. This would undesirably affect realism and immersiveness in the XR environment as disjointed embedding of the first culled virtual object would be perceived as a visual glitch by the user in the XR environment. Therefore, the at least one processor optionally applies the blur and fade filter to the pixel values of the region in the intermediate XR image that spans across the culled boundary, so that said region appears to be faded and/or blurred. This makes the first culled virtual object appear smoothly and gradually blended with the at least one second virtual object and/or the real objects of the intermediate XR image, thereby realistically generating the XR image. Beneficially, the XR image generated in such a manner would be natural-looking or realistic.

The present disclosure also relates to the method as described above. Various embodiments and variants disclosed above apply mutatis mutandis to the method.

Optionally, the method further comprises:
if none of the width of the culled part or the remaining part of the at least one virtual object is less than the predefined percentage of the total width,
    embedding the at least one culled virtual object at the given position in the given visible-light image to generate an intermediate extended-reality image; and
    applying a blur and fade filter to pixel values of a region in the intermediate extended-reality image that spans across a culled boundary of the at least one culled virtual object, to generate the extended-reality image.

Optionally, the method further comprises:
detecting, using the occlusion mask, a shape of a boundary of a real object occluding the at least one virtual object that is in a proximity of the culled boundary of the at least one culled virtual object; and
identifying said region in the intermediate extended-reality image, based on a relative position of the culled boundary of the at least one culled virtual object with respect to the boundary of the real object.

Optionally, the method further comprises:
culling a part of a first virtual object that is to be occluded by at least one second virtual object to generate a first culled virtual object representing a remaining part of the first virtual object, wherein the first virtual object is to be embedded at a first position in the given visible-light image;
detecting whether a width of the culled part or the remaining part of the first virtual object is less than the predefined percentage of a total width of the first virtual object;
if the width of the culled part of the first virtual object is less than the predefined percentage of the total width, determining a second position that is offset by at least the width of the culled part of the first virtual object from the first position and embedding an entirety of the first virtual object at the second position in the given visible-light image to generate the extended-reality image; and
if the width of the remaining part of the first virtual object is less than the predefined percentage of the total width, culling the entirety of the first virtual object.

Optionally, the method further comprises:
if none of the width of the culled part or the remaining part of the first virtual object is less than the predefined percentage of the total width,
    embedding the first culled virtual object at the first position in the given visible-light image to generate the intermediate extended-reality image; and applying a blur and fade filter to pixel values of a first region in the intermediate extended-reality image that spans across a culled boundary of the first culled virtual object, to generate the extended-reality image.

Optionally, in the method, the step of obtaining the three-dimensional model of the real-world environment comprises:
controlling a plurality of image sensors to capture a plurality of images of the real-world environment, whilst processing the pose-tracking data to determine corresponding poses of the plurality of image sensors with respect to which the plurality of images are captured; and processing the plurality of images, based on the corresponding poses of the plurality of image sensors, to generate the three-dimensional model of the real-world environment.

Optionally, the method further comprises:
determining a tolerance limit of the pose of the at least one visible-light camera; and
adjusting the predefined percentage based on the tolerance limit.

DETAILED DESCRIPTION OF THE DRAWINGS

Referring to FIG. 1, illustrated is a block diagram of an architecture of an imaging system 100, in accordance with an embodiment of the present disclosure. The imaging system 100 comprises at least one visible-light camera (depicted as a visible-light camera 102), pose-tracking means 104, and at least one processor (depicted as a processor 106). The processor 106 is communicably coupled to the visible-light camera 102 and the pose-tracking means 104.

Figure 2:
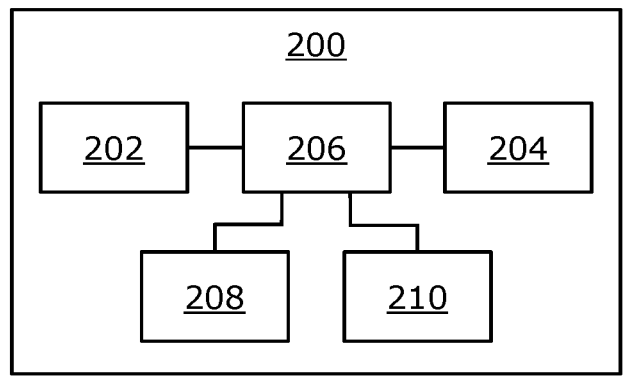

Referring to FIG. 2, illustrated is a block diagram of an architecture of an imaging system 200, in accordance with another embodiment of the present disclosure. The imaging system 200 comprises at least one visible-light camera (depicted as a visible-light camera 202), pose-tracking means 204, and at least one processor (depicted as a processor 206), and a plurality of image sensors (depicted as image sensors 208 and 210). The processor 206 is communicably coupled to the visible-light camera 202, the pose-tracking means 204, and the image sensors 208 and 210.

It may be understood by a person skilled in the art that the FIGS. 1 and 2 include simplified architectures of the imaging systems 100 and 200 for sake of clarity, which should not unduly limit the scope of the claims herein. The person skilled in the art will recognize many variations, alternatives, and modifications of embodiments of the present disclosure.

Figure 3:
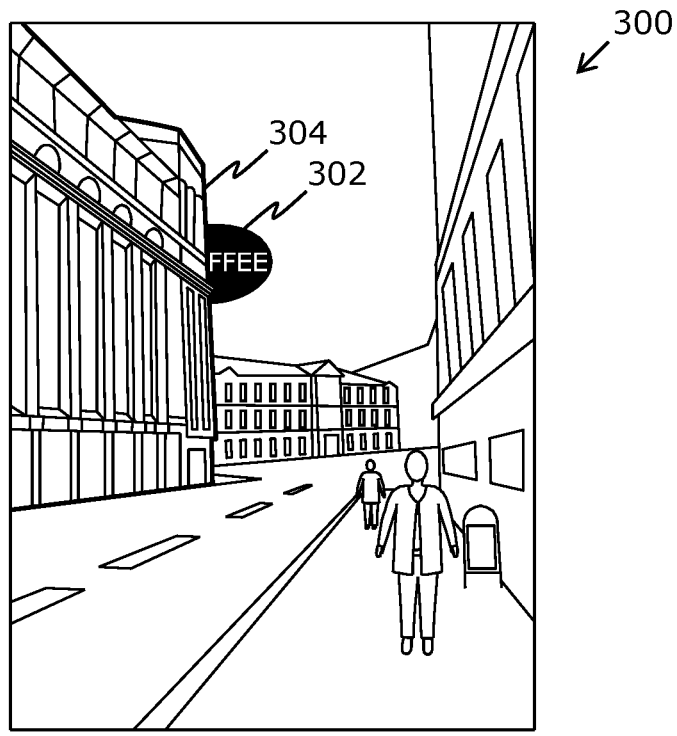
FIG. 3 illustrates an exemplary extended-reality image, in accordance with an embodiment of the present disclosure.

Referring to FIG. 3, illustrated is an exemplary extended-reality image 300, in accordance with an embodiment of the present disclosure. The extended-reality (XR) image 300 represents, for example, a mixed reality (MR) outdoor environment. The MR outdoor environment represents a street view of a real-world environment as well as a virtual object 302 (depicted as a virtual coffee advertising poster). The street view represents real objects such as, the sky, a road, humans, buildings, a letter box, and the like, that are present in the real-world environment. The virtual object 302 is embedded in a visible-light image (not shown) of the real-world environment to generate the XR image 300 in a manner that a culled part of the virtual object 302 is occluded by a building 304 (on a left side of the XR image 300), and a remaining part of the virtual object 302 is visible in the XR image 300.

Figure 4A:
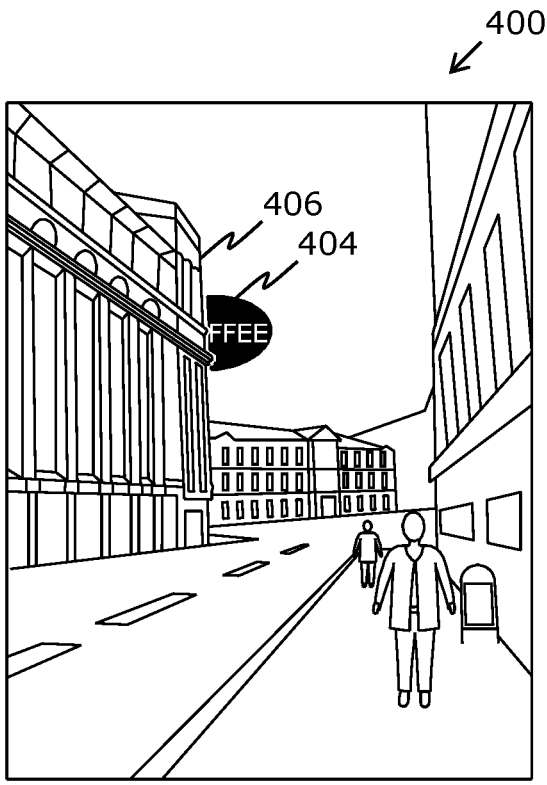
Figure 4B:
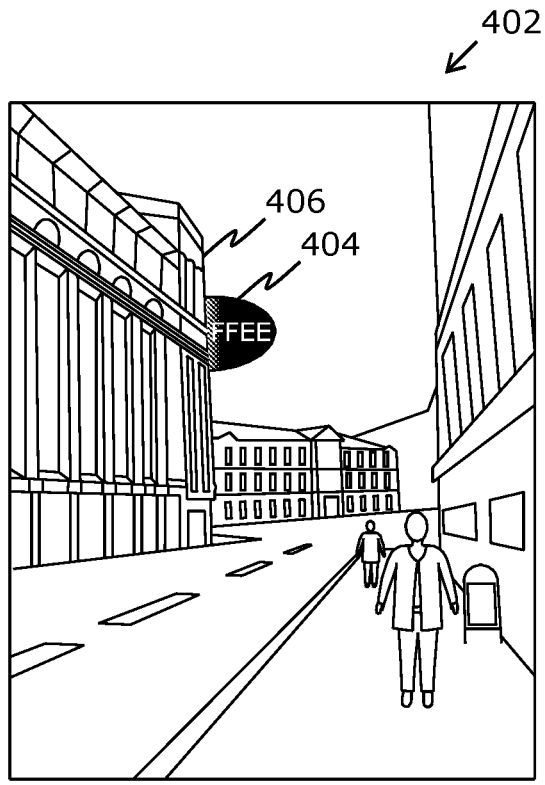
FIG. 4B illustrates an exemplary extended-reality image that is generated using the exemplary intermediate extended-reality image of FIG. 4A, in accordance with an embodiment of the present disclosure.

Referring to FIGS. 4A and 4B, FIG. 4A illustrates an exemplary intermediate extended-reality image 400, while FIG. 4B illustrates an exemplary extended-reality image 402 that is generated using the exemplary intermediate extended-reality image 400 of FIG. 4A, in accordance with an embodiment of the present disclosure. The intermediate extended-reality (XR) image 400 represents, for example, a mixed reality (MR) outdoor environment. The MR outdoor environment represents a street view of a real-world environment as well as a culled virtual object 404 (depicted as a virtual coffee advertising poster). The street view represents real objects such as, the sky, a road, humans, buildings, a letter box, and the like, that are present in the real-world environment. The culled virtual object 404 is embedded at a given position in a visible-light image (not shown) to generate the intermediate XR image 400. Upon embedding the culled virtual object 404 at the given position, the culled virtual object 404 appears disjointed or away from a part of a building 406. Therefore, at least one processor (not shown) is configured to apply a blur and fade filter to pixel values of a region in the intermediate XR image 400 that spans across a culled boundary of the culled virtual object 404, to generate the XR image 402. Thus, the culled virtual object 404 appears smoothly and gradually blended in the XR image 402 in a manner that a displacement of the culled virtual object 404 from the part of the building 406 is not perceptible in the XR image 402.

Figure 5A:
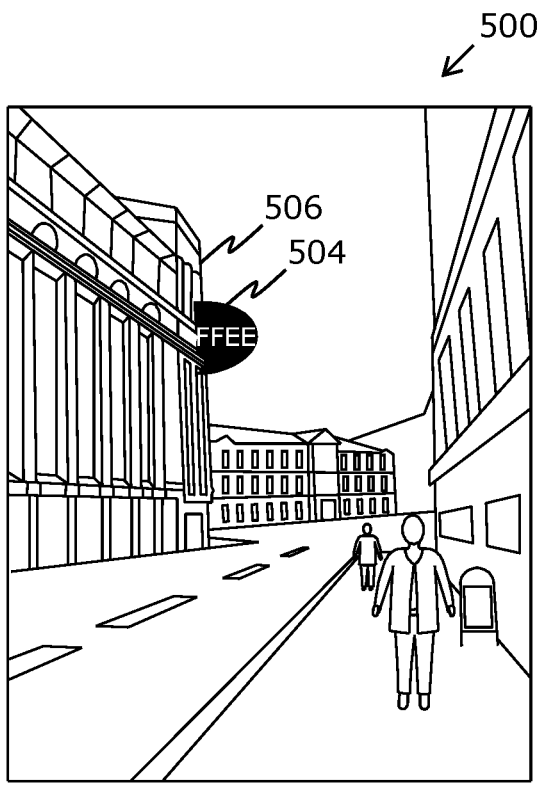
Figure 5B:
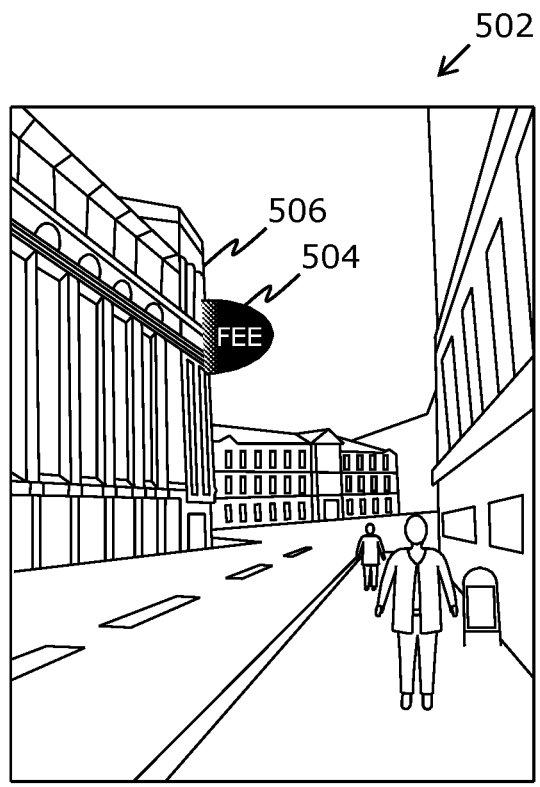
FIG. 5B illustrates an exemplary extended-reality image that is generated using the exemplary intermediate extended-reality image of FIG. 5A, in accordance with another embodiment of the present disclosure.

Referring to FIGS. 5A and 5B, FIG. 5A illustrates an exemplary intermediate extended-reality image 500, while FIG. 5B illustrates an exemplary extended-reality image 502 that is generated using the exemplary intermediate extended-reality image 500 of FIG. 5A, in accordance with an embodiment of the present disclosure. The intermediate extended-reality (XR) image 500 represents, for example, a mixed reality (MR) outdoor environment. The MR outdoor environment represents a street view of a real-world environment as well as a culled virtual object 504 (depicted as a virtual coffee advertising poster). The street view represents real objects such as, the sky, a road, humans, buildings, a letter box, and the like, that are present in the real-world environment. The culled virtual object 504 is embedded at a given position in a visible-light image (not shown) to generate the intermediate XR image 500. Upon embedding the culled virtual object 504 at the given position, the culled virtual object 504 appears slightly misplaced (or incorrectly placed) over a part of a building 506. Therefore, at least one processor (not shown) is configured to apply a blur and fade filter to pixel values of a region in the intermediate XR image 500 that spans across a culled boundary of the culled virtual object 504, to generate the XR image 502. Thus, the culled virtual object 504 appears smoothly and gradually blended in the XR image 502 in a manner that the slight misplacement of the culled virtual object 504 over the part of the building 506 is not perceptible in the XR image 502.

It may be understood by a person skilled in the art that the FIGS. 4A, 4B, 5A, and 5B are merely examples for sake of clarity, which should not unduly limit the scope of the claims herein. The person skilled in the art will recognize many variations, alternatives, and modifications of embodiments of the present disclosure.

Figure 6A:
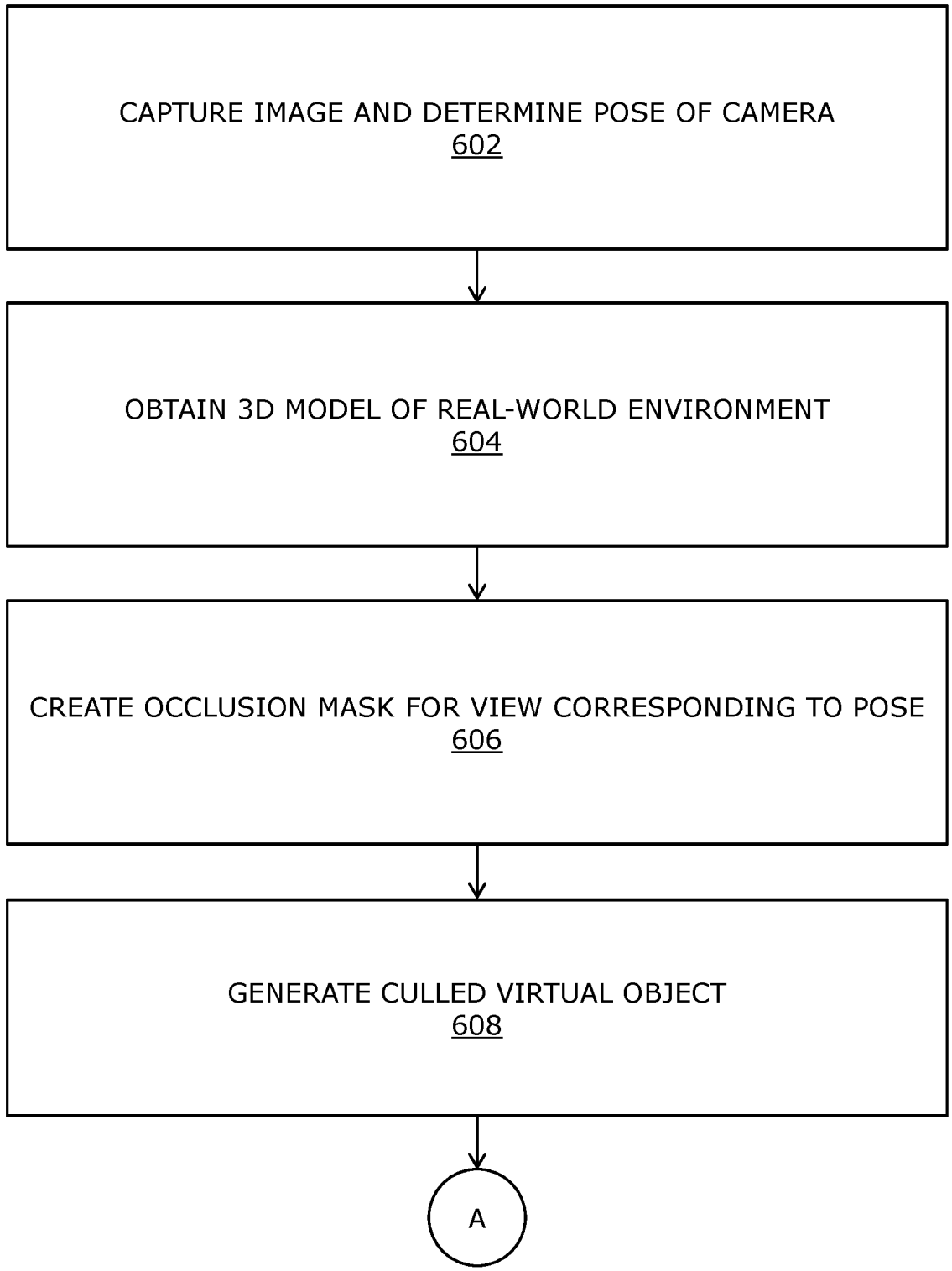
FIGS. 6A and 6B illustrate steps of a method, in accordance with an embodiment of the present disclosure.
Figure 6B:
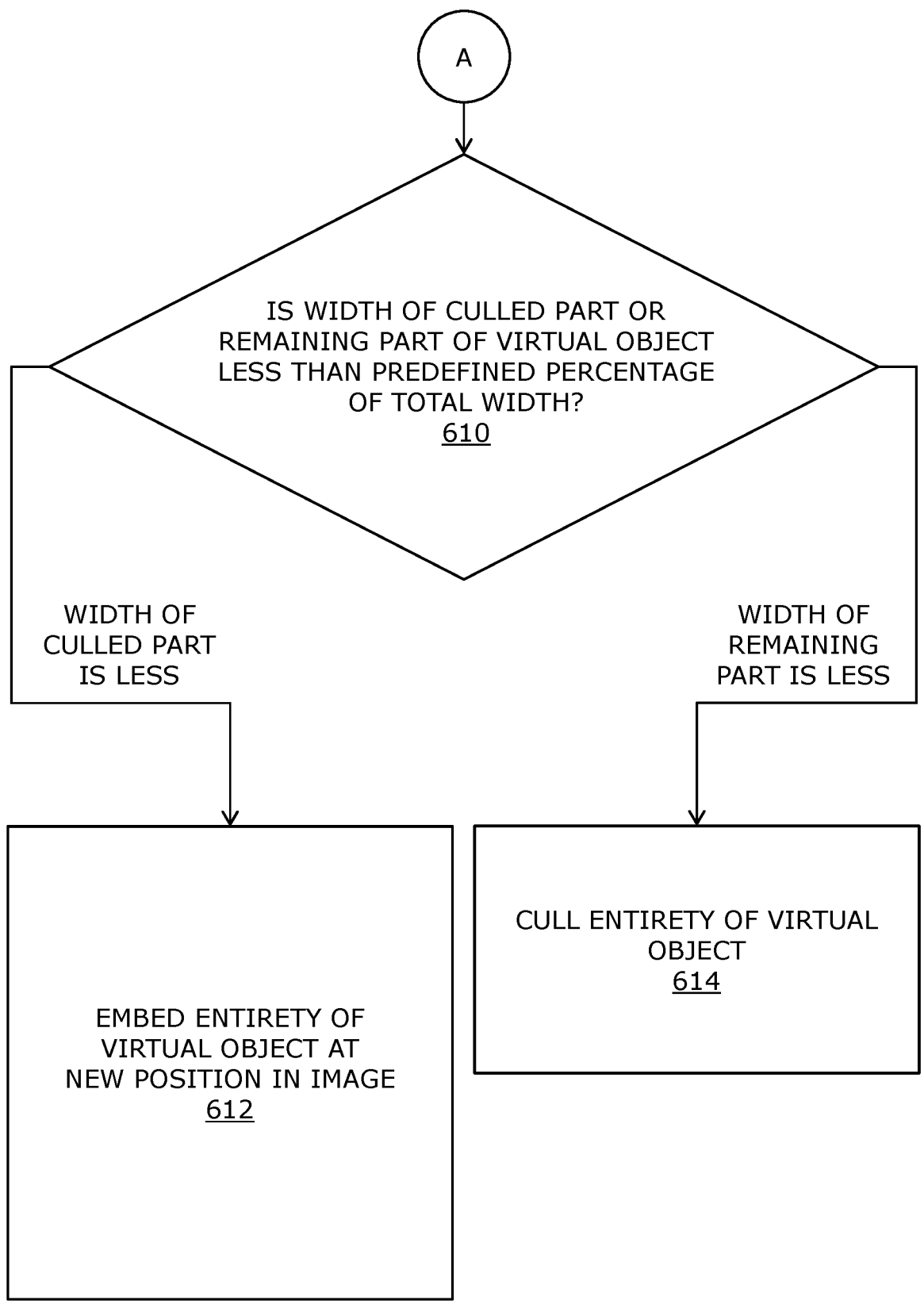

Referring to FIGS. 6A and 6B, illustrated are steps of a method, in accordance with an embodiment of the present disclosure. At step 602, at least one visible-light camera is controlled to capture a given visible-light image of a real-world environment, whilst pose-tracking data obtained from pose-tracking means is processed to determine a corresponding pose of the at least one visible-light camera with respect to which the given visible-light image is captured. At step 604, a three-dimensional model of the real-world environment is obtained. At step 606, an occlusion mask is created for a view of the real-world environment that corresponds to the determined pose of the at least one visible-light camera, using the three-dimensional model of the real-world environment. At step 608, a part of at least one virtual object is culled, based on the occlusion mask, to generate at least one culled virtual object representing a remaining part of the at least one virtual object, wherein the at least one virtual object is to be embedded at a given position in the given visible-light image. At step 610, it is detected whether a width of the culled part or the remaining part of the at least one virtual object is less than a predefined percentage of a total width of the at least one virtual object. When it is detected that the width of the culled part of the at least one virtual object is less than the predefined percentage of the total width, at step 612, a new position that is offset by at least the width of the culled part from the given position is determined, and an entirety of the at least one virtual object is embedded at the new position in the given visible-light image to generate an extended-reality image. Otherwise, when it is detected that the width of the remaining part of the at least one virtual object is less than the predefined percentage of the total width, at step 614, the entirety of the at least one virtual object is culled.

The steps 602, 604, 606, 608, 610, 612, and 614 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising:
    at least one visible-light camera;
    pose-tracking means; and
    at least one processor configured to:
        control the at least one visible-light camera to capture a given visible-light image of a real-world environment, whilst processing pose-tracking data obtained from the pose-tracking means to determine a corresponding pose of the at least one visible-light camera with respect to which the given visible-light image is captured;
        obtain a three-dimensional model of the real-world environment;
        create an occlusion mask for a view of the real-world environment that corresponds to the determined pose of the at least one visible-light camera, using the three-dimensional model of the real-world environment;
        cull a part of at least one virtual object, based on the occlusion mask, to generate at least one culled virtual object representing a remaining part of the at least one virtual object, wherein the at least one virtual object is to be embedded at a given position in the given visible-light image;
        detect whether a width of the culled part or the remaining part of the at least one virtual object is less than a predefined percentage of a total width of the at least one virtual object;
        if the width of the culled part of the at least one virtual object is less than the predefined percentage of the total width, determine a new position that is offset by at least the width of the culled part from the given position and embed an entirety of the at least one virtual object at the new position in the given visible-light image to generate an extended-reality image; and
        if the width of the remaining part of the at least one virtual object is less than the predefined percentage of the total width, cull the entirety of the at least one virtual object.

2. The imaging system of claim 1, wherein the at least one processor is configured to:
    if none of the width of the culled part or the remaining part of the at least one virtual object is less than the predefined percentage of the total width,
        embed the at least one culled virtual object at the given position in the given visible-light image to generate an intermediate extended-reality image; and
        apply a blur and fade filter to pixel values of a region in the intermediate extended-reality image that spans across a culled boundary of the at least one culled virtual object, to generate the extended-reality image.

3. The imaging system of claim 2, wherein the at least one processor is configured to:
    detect, using the occlusion mask, a shape of a boundary of a real object occluding the at least one virtual object that is in a proximity of the culled boundary of the at least one culled virtual object; and
    identify said region in the intermediate extended-reality image, based on a relative position of the culled boundary of the at least one culled virtual object with respect to the boundary of the real object.

4. The imaging system of claim 1, wherein the at least one processor is configured to:
    cull a part of a first virtual object that is to be occluded by at least one second virtual object to generate a first culled virtual object representing a remaining part of the first virtual object, wherein the first virtual object is to be embedded at a first position in the given visible-light image;
    detect whether a width of the culled part or the remaining part of the first virtual object is less than the predefined percentage of a total width of the first virtual object;
    if the width of the culled part of the first virtual object is less than the predefined percentage of the total width, determine a second position that is offset by at least the width of the culled part of the first virtual object from the first position and embed an entirety of the first virtual object at the second position in the given visible-light image to generate the extended-reality image; and
    if the width of the remaining part of the first virtual object is less than the predefined percentage of the total width, cull the entirety of the first virtual object.

5. The imaging system of claim 4, wherein the at least one processor is configured to:
    if none of the width of the culled part or the remaining part of the first virtual object is less than the predefined percentage of the total width,
        embed the first culled virtual object at the first position in the given visible-light image to generate the intermediate extended-reality image; and
        apply a blur and fade filter to pixel values of a first region in the intermediate extended-reality image that spans across a culled boundary of the first culled virtual object, to generate the extended-reality image.

6. The imaging system of claim 1, further comprising a plurality of image sensors wherein, when obtaining the three-dimensional model of the real-world environment, the at least one processor configured to:

control the plurality of image sensors to capture a plurality of images of the real-world environment, whilst processing the pose-tracking data to determine corresponding poses of the plurality of image sensors with respect to which the plurality of images are captured; and process the plurality of images, based on the corresponding poses of the plurality of image sensors, to generate the three-dimensional model of the real-world environment.

7. The imaging system of claim 1, wherein the at least one processor is configured to:
determine a tolerance limit of the pose of the at least one visible-light camera; and
adjust the predefined percentage based on the tolerance limit.

8. A method comprising:
controlling at least one visible-light camera to capture a given visible-light image of a real-world environment, whilst processing pose-tracking data obtained from pose-tracking means to determine a corresponding pose of the at least one visible-light camera with respect to which the given visible-light image is captured;
obtaining a three-dimensional model of the real-world environment;
creating an occlusion mask for a view of the real-world environment that corresponds to the determined pose of the at least one visible-light camera, using the three-dimensional model of the real-world environment;
culling a part of at least one virtual object, based on the occlusion mask, to generate at least one culled virtual object representing a remaining part of the at least one virtual object, wherein the at least one virtual object is to be embedded at a given position in the given visible-light image;
detecting whether a width of the culled part or the remaining part of the at least one virtual object is less than a predefined percentage of a total width of the at least one virtual object;
if the width of the culled part of the at least one virtual object is less than the predefined percentage of the total width, determining a new position that is offset by at least the width of the culled part from the given position and embedding an entirety of the at least one virtual object at the new position in the given visible-light image to generate an extended-reality image; and
if the width of the remaining part of the at least one virtual object is less than the predefined percentage of the total width, culling the entirety of the at least one virtual object.

9. The method of claim 8, further comprising:
if none of the width of the culled part or the remaining part of the at least one virtual object is less than the predefined percentage of the total width,
embedding the at least one culled virtual object at the given position in the given visible-light image to generate an intermediate extended-reality image; and
applying a blur and fade filter to pixel values of a region in the intermediate extended-reality image that spans across a culled boundary of the at least one culled virtual object, to generate the extended-reality image.

10. The method of claim 9, further comprising:
detecting, using the occlusion mask, a shape of a boundary of a real object occluding the at least one virtual object that is in a proximity of the culled boundary of the at least one culled virtual object; and
identifying said region in the intermediate extended-reality based on a relative position of the culled boundary of the at least one culled virtual object with respect to the boundary of the real object.

11. The method of any of claim 8, further comprising:
culling a part of a first virtual object that is to be occluded by at least one second virtual object to generate a first culled virtual object representing a remaining part of the first virtual object, wherein the first virtual object is to be embedded at a first position in the given visible-light image;
detecting whether a width of the culled part or the remaining part of the first virtual object is less than the predefined percentage of a total width of the first virtual object;
if the width of the culled part of the first virtual object is less than the predefined percentage of the total width, determining a second position that is offset by at least the width of the culled part of the first virtual object from the first position and embedding an entirety of the first virtual object at the second position in the given visible-light image to generate the extended-reality image; and
if the width of the remaining part of the first virtual object is less than the predefined percentage of the total width, culling the entirety of the first virtual object.

12. The method of claim 11, further comprising:
if none of the width of the culled part or the remaining part of the first virtual object is less than the predefined percentage of the total width,
embedding the first culled virtual object at the first position in the given visible-light image to generate the intermediate extended-reality image; and
applying a blur and fade filter to pixel values of a first region in the intermediate extended-reality image that spans across a culled boundary of the first culled virtual object, to generate the extended-reality image.

13. The method of claim 8, wherein the step of obtaining the three-dimensional model of the real-world environment comprises:
controlling a plurality of image sensors to capture a plurality of images of the real-world environment, whilst processing the pose-tracking data to determine corresponding poses of the plurality of image sensors with respect to which the plurality of images are captured; and
processing the plurality of images, based on the corresponding poses of the plurality of image sensors, to generate the three-dimensional model of the real-world environment.

14. The method of claim 8, further comprising:
determining a tolerance limit of the pose of the at least one visible-light camera; and
adjusting the predefined percentage based on the tolerance limit.

* * * * *